US011017008B2

(12) United States Patent
Burd et al.

(10) Patent No.: US 11,017,008 B2
(45) Date of Patent: May 25, 2021

(54) METHOD AND SYSTEM FOR CONTEXTUALIZING PROCESS DATA

(71) Applicant: Honeywell International Inc., Morris Plains, NJ (US)

(72) Inventors: Matthew Burd, Calgary (CA); Damian Marshall, Nedlands (AU); Jan Pingel, Weddington, NC (US)

(73) Assignee: Honeywell International Inc., Morris Plains, NJ (US)

( * ) Notice: Subject to any disclaimer, the term of this patent is extended or adjusted under 35 U.S.C. 154(b) by 357 days.

(21) Appl. No.: 15/921,474

(22) Filed: Mar. 14, 2018

(65) Prior Publication Data
US 2019/0286742 A1 Sep. 19, 2019

(51) Int. Cl.
*G06F 16/00* (2019.01)
*G06F 16/38* (2019.01)
*G06F 40/205* (2020.01)

(52) U.S. Cl.
CPC .......... *G06F 16/381* (2019.01); *G06F 40/205* (2020.01)

(58) Field of Classification Search
CPC ..... G06F 16/381; G06F 16/907; G06F 40/205
See application file for complete search history.

(56) References Cited

U.S. PATENT DOCUMENTS

| 8,460,111 | B2* | 6/2013 | Hart | A63B 71/0622 463/42 |
| 8,712,989 | B2* | 4/2014 | Wei | G06F 40/274 707/706 |
| 9,420,121 | B2* | 8/2016 | Grosz | G06F 16/51 |
| 9,759,803 | B2* | 9/2017 | O'Hagan | G01S 5/0205 |
| 10,528,700 | B2* | 1/2020 | Thomsen | G06F 40/117 |
| 10,599,720 | B2* | 3/2020 | Moore | G06F 16/907 |
| 2006/0242180 | A1* | 10/2006 | Graf | G06F 16/86 |
| 2009/0287674 | A1* | 11/2009 | Bouillet | G06F 16/9562 |
| 2012/0066215 | A1* | 3/2012 | Gerstner | G06F 16/444 707/723 |
| 2012/0066275 | A1* | 3/2012 | Gerstner | G06F 16/444 707/825 |
| 2012/0143897 | A1* | 6/2012 | Wei | G06F 40/274 707/769 |

(Continued)

OTHER PUBLICATIONS

Pingel et al., "Creating the Next-Generation Historian with the Cloud," Automation.com, Nov. 2016, 6 pages.

(Continued)

*Primary Examiner* — Jean M Corrielus
(74) *Attorney, Agent, or Firm* — Ortiz & Lopez, PLLC; Kermit D. Lopez; Luis M. Ortiz

(57) ABSTRACT

A method and apparatus for mapping measurement tags to assets. At least one memory is configured to store a plurality of tags. At least one processor is configured to parse a database of the plurality of tags to identify patterns of terms, wherein the plurality of tags include one or more terms and are related to measurements performed by an asset in an industrial process control and automation system. The processor is further configured to display the plurality of tags grouped by the identified patterns of terms. The processor is further configured to receive an input to map the tag related to the asset based on the identified patterns of terms. The processor is further configured to map the tag to the asset based on the input.

17 Claims, 7 Drawing Sheets

(56) References Cited

U.S. PATENT DOCUMENTS

| | | | | |
|---|---|---|---|---|
| 2014/0244325 | A1* | 8/2014 | Cartwright | G06F 16/288 |
| | | | | 705/7.12 |
| 2016/0116378 | A1* | 4/2016 | Bates | G05B 23/024 |
| | | | | 702/182 |
| 2018/0082217 | A1* | 3/2018 | Bates | G05B 23/024 |
| 2018/0121530 | A1* | 5/2018 | McGregor | G06F 16/27 |
| 2018/0276254 | A1* | 9/2018 | Whitlock | G06F 16/11 |
| 2019/0227504 | A1* | 7/2019 | Ma | G05B 13/042 |
| 2019/0303817 | A1* | 10/2019 | Cartwright | H04L 67/10 |
| 2020/0074025 | A1* | 3/2020 | Thomsen | G06F 16/248 |
| 2020/0201916 | A1* | 6/2020 | Moore | G06F 16/907 |

OTHER PUBLICATIONS

Pingel et al., "Gateways, Partitions and Tenants: A Checklist for Building the Right Architecture for Cloud-Based Historians," Automation.com, Jun. 2017, 16 pages.

* cited by examiner

METHOD AND SYSTEM FOR CONTEXTUALIZING PROCESS DATA

TECHNICAL FIELD

This disclosure relates generally to the asset tagging management. More specifically, this disclosure relates to a method and system for contextualizing process data.

BACKGROUND

Process plants are often managed using industrial process control and automation systems including the use of plant historians. Plant historians can contain thousands of measurement tags, each named after specific measurement points in the field. When consolidated across multiple sites or the enterprise there can be millions of tags. Local plant operators and engineers are generally familiar with tag naming conventions but business users and corporate specialists are not. Further, there are often multiple distinct naming conventions used within a specific plant and distinct naming conventions used between plants in an enterprise. This makes it difficult and time-consuming to find data required for analysis and other tasks.

SUMMARY

This disclosure provides a method and system for contextualizing process data.

An embodiment of this disclosure provides a method for contextualizing tag data. The method includes parsing a database of a plurality of tags to identify patterns of terms, wherein the plurality of tags include one or more terms and are related to measurements performed by asset in an industrial process control and automation system. The method also includes displaying the plurality of tags grouped by the identified patterns of terms. The method also includes receiving an input to map a tag to the asset based on the identified patterns of terms. The method also includes mapping the tag to the asset based on the input.

Another embodiment of this disclosure provides a system that includes a memory and at least one processor. The memory is configured to store a plurality of tags. The at least one processor is configured to parse a database of the plurality of tags to identify patterns of terms, wherein the plurality of tags include one or more terms and are related to measurements performed by an asset in an industrial process control and automation system. The at least one processor is further configured to display the plurality of tags grouped by the identified patterns of terms. The at least one processor is further configured to receive an input to map a tag to the asset based on the identified patterns of terms. The at least one processor is further configured to map the tag to the asset based on the input.

Yet another embodiment provides a non-transitory computer readable medium containing instructions that, when executed by at least one processing device, cause the at least one processing device to parse a database of a plurality of tags to identify patterns of terms, wherein the plurality of tags include one or more terms and are related to measurements performed by asset in an industrial process control and automation system. The instructions further cause the at least one processing device to display the plurality of tags grouped by the identified patterns of terms. The instructions further cause the at least one processing device to receive an input to map a tag to the asset based on the identified patterns of terms. The instructions further cause the at least one processing device to map the tag to the asset based on the input.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
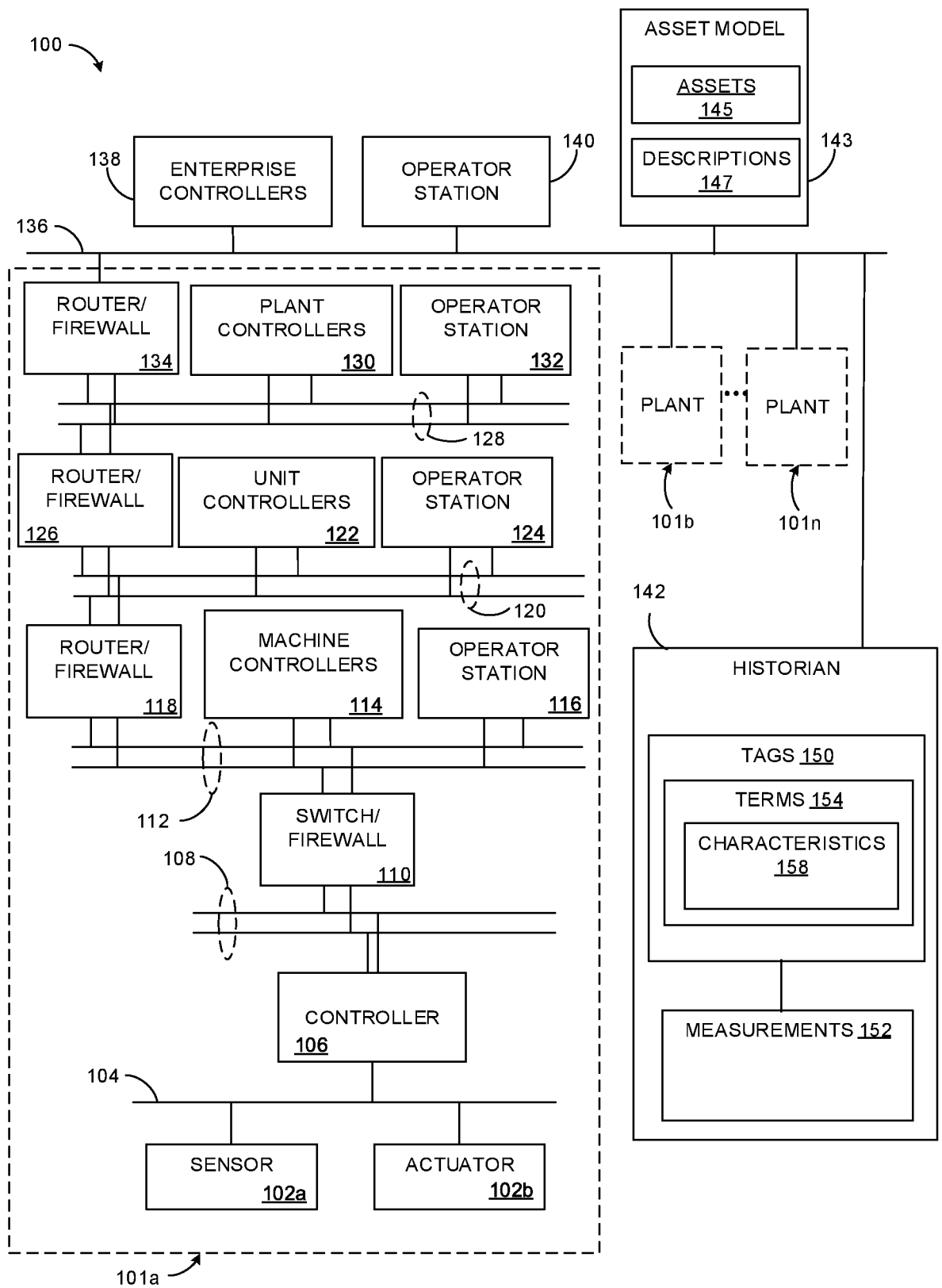
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

One or more networks 104 are coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" includes one or more controllers 106, which are coupled to the network 104. Among other things, each controller 106 may use the measurements from one or more sensors 102a to control the operation of one or more actuators 102b. Each controller 106 includes any suitable structure for controlling one or more aspects of a process system. As a particular example, each controller 106 could represent a computing device running a real-time operating system.

Redundant networks 108 are coupled to the controllers 106. The networks 108 facilitate interaction with the controllers 106, such as by transporting data to and from the controllers 106. The networks 108 could represent any suitable redundant networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS, LINUX, or other operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS. LINUX, or other operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS. LINUX, or other operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS. LINUX, or other operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS. LINUX, or other operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS. LINUX, or other operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS, LINUX, or other operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS. LINUX, or other operating system.

A historian 142 is also coupled to the network 136 in this example. The historian 142 could represent a component that stores various information about the system 100. The historian 142 could, for example, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100. The historian 142 can be, for example, a database or set of databases that includes a security events archiver and/or UA log files.

In one or more embodiments, the historian 142 logs measurements taken by sensor(s) 102a or actuator(s) 102b. Herein, sensor(s) 102a and actuators 102b may be referred to as field devices 102. Historian 142 stores and maps measurements 152 of a field device 102 to different tags 150. The system 100 also includes an asset model 143. The asset model 143 includes assets 145.

The measurement 152 of the field devices may be related to different assets 145 in system 100. The assets can include individual pieces of equipment, or a grouping of equipment. Each of the tags 150 includes different terms 154. The asset model also includes descriptions 147 of the assets. Descriptions 147 may include traits, characteristics, locations, etc. about the assets 145.

Each of the terms 154 include characteristics 158. For example, the term 154 may be numerical, alphabetic, or a delimiter. The historian 142, or other suitable device, is able to parse the tags 150 to determine common patterns of terms 154. In one approach, when inspecting the characters in a tag 150 starting at the beginning, each change between alphabetic, numeric, or delimiter characters could be considered to indicate the beginning of a new term 154 in the pattern. For example 05FC101.PV can be described by terms [numeric], [alpha], [numeric], [.] and [alpha] and could be expressed as a regular expression.

The historian 142 can provide to a user or operator each detected pattern, ordered by my most to least frequent. The user can select a pattern and see all the tags 150 that match, as a way to narrow down the set of tags to work with at any given time. For example, 05FC101.PV include a pattern of [numeric], [alpha], [numeric], [·] and [alpha]. Another tag, such as 05T101.T may be a similar pattern to 05FC101.PV because 05T101.T also includes a pattern of [numeric], [alpha], [numeric], [.] and [alpha]. The historian 142 can optionally present the tags as a hierarchy of terms, for example 05FC101.PV could be presented as 05/FC/101/PV.

The historian 142, based on input from a user, can optionally configure information about a selected pattern such as naming each term 154 and defining the order of the terms 154 for display purposes. For example, 05/FC/101/PV might make more sense as 05/101/FC/PV. The historian 142 can automatically apply this information for well-known or industry standard naming conventions. Using this technique, the groups of tags 150 may correspond directly to an asset, in which case the entire group may be selected and mapped to the asset in one operation.

For example, in some cases it may be possible to relate the various terms 154 to levels in the desired model and generate the model from the tags 150. In the example above, '05' might represent an area, '101' might represent a specific piece of equipment or asset that belongs to that area, 'FC' and 'T' might represent attributes of that equipment or asset, and 'PV' and 'OP' represent different properties of that attribute. The same logic could be automatically applied to all tags that match the pattern to generate a configured number of assets.

One or more of the devices shown in FIG. 1 could support a tagging model for contextualizing processing data. For example, any of the controllers, historians operator stations, or other computing devices shown in FIG. 1 (or added to FIG. 1 according to particular needs) could support the techniques described in this patent document.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment in which the use of tagging model is desired. However, FIG. 1 does not limit this disclosure to any particular configuration or operational environment. In general, the techniques described in this patent document can be used in any suitable system, and that system need not relate to industrial process control or automation.

Figure 2:
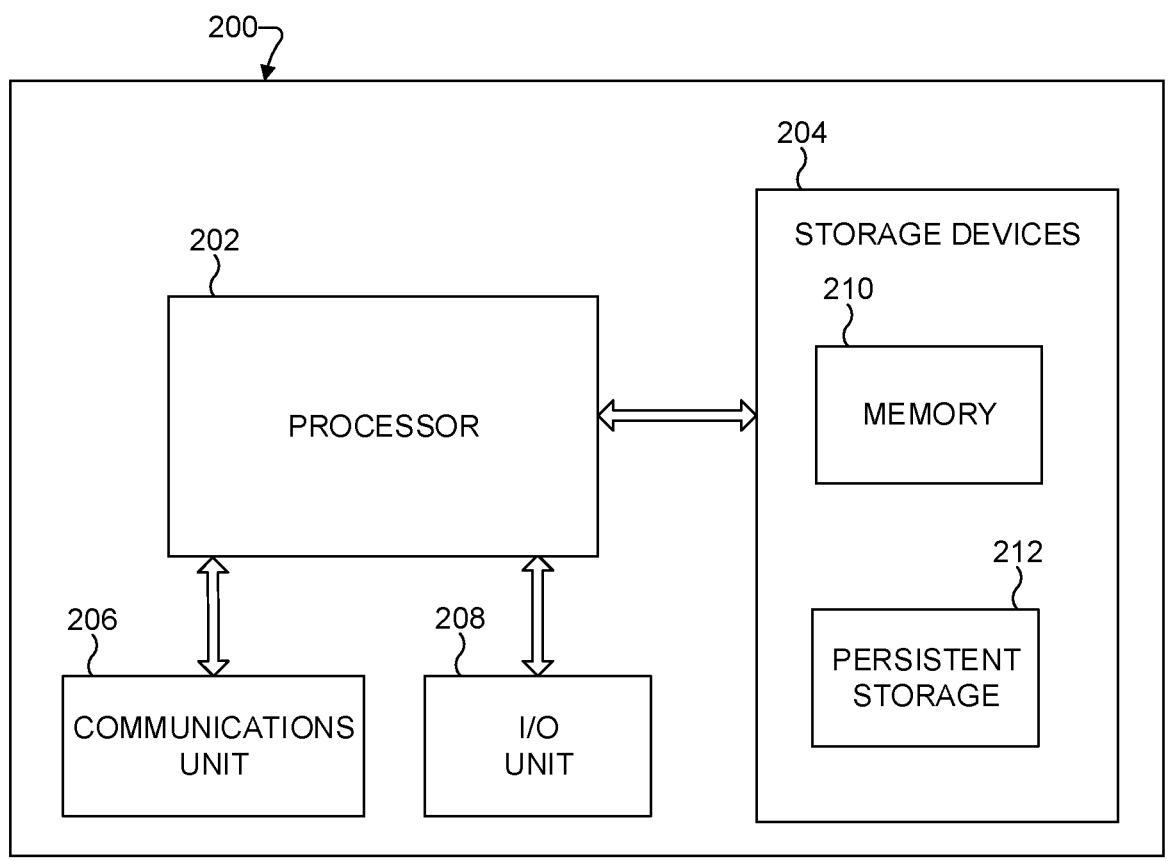
FIG. 2 illustrates an example computing device supporting a tagging model in an industrial control and automation systems according to this disclosure.

FIG. 2 illustrates an example computing device 200 supporting a tagging model in an industrial control and automation system according to this disclosure. The device 200 could, for example, represent any of the computing devices shown in FIG. 1 and described above, such as the historian 142. However, the device 200 could represent any other suitable computing system where a tagging model may be needed or desired.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 supporting a tagging model in an industrial control and automation systems according to this disclosure, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

As described in more detail below, with the advent of "big data" and data science there is a new focus on applying advanced analytics to problems like predicting equipment failure by modeling past behavior. Asset models are used to organize data by asset/equipment and individual properties (also known as attributes) of assets are mapped to measurement tags. Asset templates are used to ensure asset properties are defined consistently between assets of the same type, providing a standard way of accessing asset data regardless of the measurement tag naming conventions. Asset models and templates support, for example, querying properties of all instances of a given asset type at one or more sites and receiving the data in a consistent, directly comparable format.

One or more embodiments of this disclosure recognize and take into account that while asset models greatly simplify accessing and comparing data, the process of defining the asset model and mapping it to measurement tags is manual and extremely time-consuming. Companies may have different representations of their assets in various systems but they may not agree with each other as they were built for different purposes. Aligning these models is a challenge that ultimately requires user judgement to resolve. Once a standard model is agreed upon it generally only provides a high level description of the assets, rarely includes sufficient information about asset properties and almost never maps asset properties to measurement tags. The tag mapping process is the single largest effort and is often considered too much work.

The disclosed embodiments provide an asset model and mapping it to measurement tags, which allows for the end-to-end configuration effort to be reduced, lowering barriers to adoption of an asset model, thereby facilitating advanced analytics. Existing asset model solutions rely largely on manual input of assets and tag mapping based on the users' knowledge. The embodiments described herein help the user perform these tasks by suggesting groups of tags that are related in a variety of ways on the assumption that related tags are likely to relate to the same assets. The embodiments described herein also support a workflow for incrementally building the model and mapping tags. Typical analytics projects spend 80% of the time organizing data and only 20% of the time analyzing it. The embodiments herein can reduce the time and cost of creating and mapping models, which in many cases can make the difference between a customer configuring a model and not. Once configured, these models enable analytics to be performed more easily and quickly, resulting in faster time to benefit.

FIGS. 3A-3G illustrate an example tagging workflow according to embodiments of this disclosure. The workflow could, for example, be performed by any of the devices shown in FIG. 1 or device 200 shown in FIG. 2 described above. However, the workflow could represent any other suitable workflow where a tagging model may be used. The different embodiments shown in FIGS. 3A-3G can be performed singularly, in combination, in parallel, or serially.

Figure 3A:
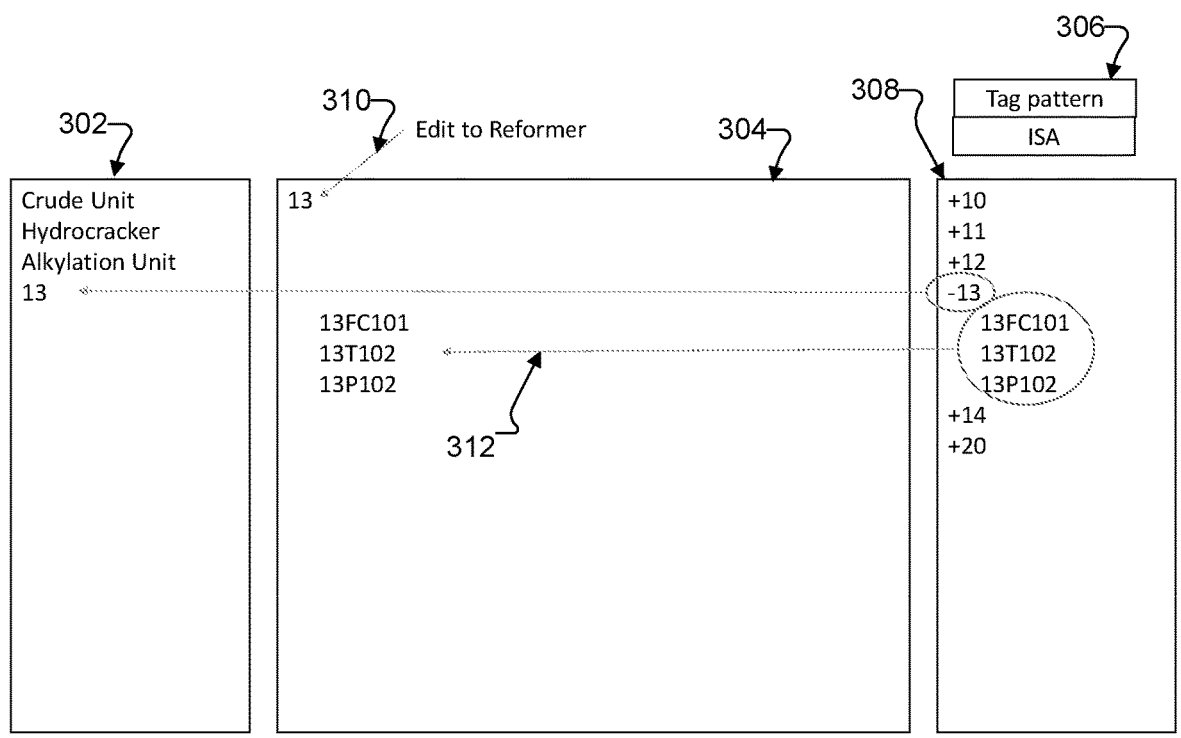
FIGS. 3A-3G illustrate an example tagging workflow according to embodiments of this disclosure.

FIG. 3A illustrates an example of organizing tags including an asset list 302, editor 304, current action 306, and tags 308. The asset list 302 could be based on assets in a specific plant, or area of the plant. The editor 304 is where tags related to the asset models are added, removed, or updated. The current action 306 indicates the current action, such as "tag pattern" to indicate organization of tags 308 based on patterns. In FIG. 3A, the patterns are based on industry standard architectures (ISA).

In FIG. 3A, asset "13" is selected 310 to edit in the editor, where the tags 308 lists tags based on pattern. At step 312, the user selects tags "13FC101", "13T102", and "13P102" as being mapped to asset "13". In this example, the user may be able to identify that these tags are related to asset "13" because of the groupings in list 308. This embodiment provides an improved graphical user interface (GUI) by allowing a user more visible access to the tags located in a historian. This solves a problem of having too much data to display on a GUI.

Figure 3B:
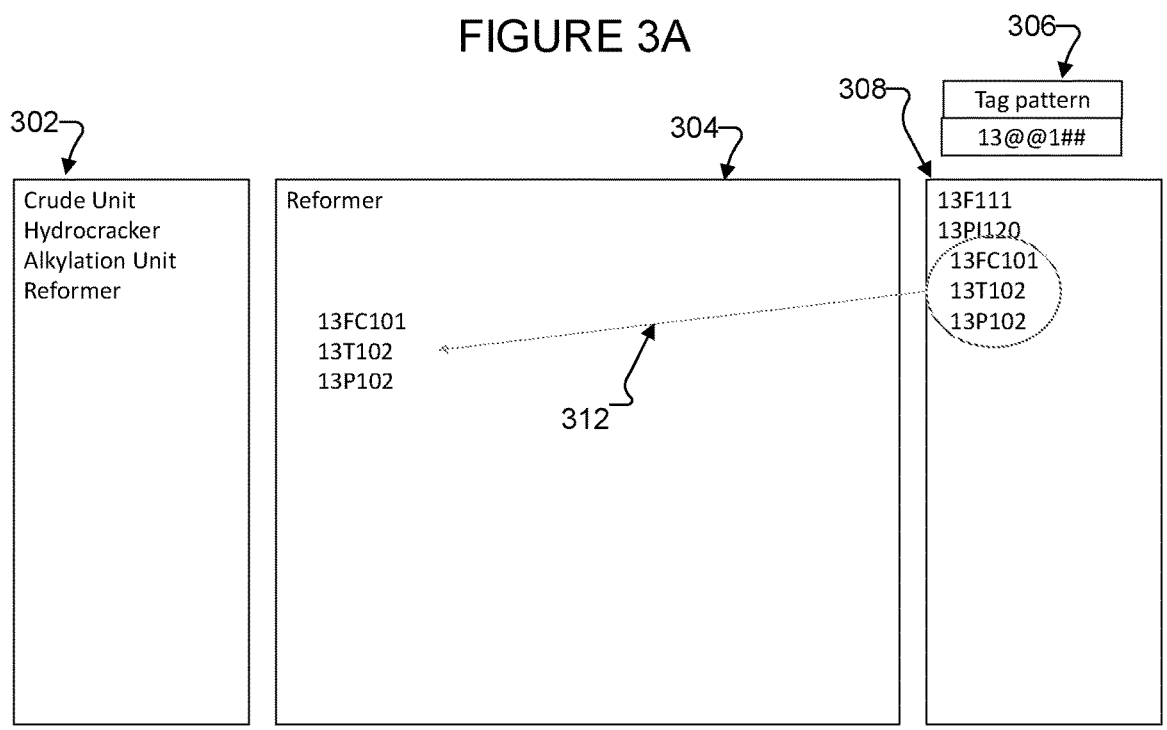

In FIG. 3B, the current action 306 is a search tags action based on the tag pattern. Here, each tag that meets the condition "13 @ @1 ##" can be retrieved and displayed. At step 312, the user can select which tags to map to the assets. In this example, the asset being edited is the "reformer". The system associated the reformer with the tags "13FC101", "13T102", and "13P102".

Figure 3C:
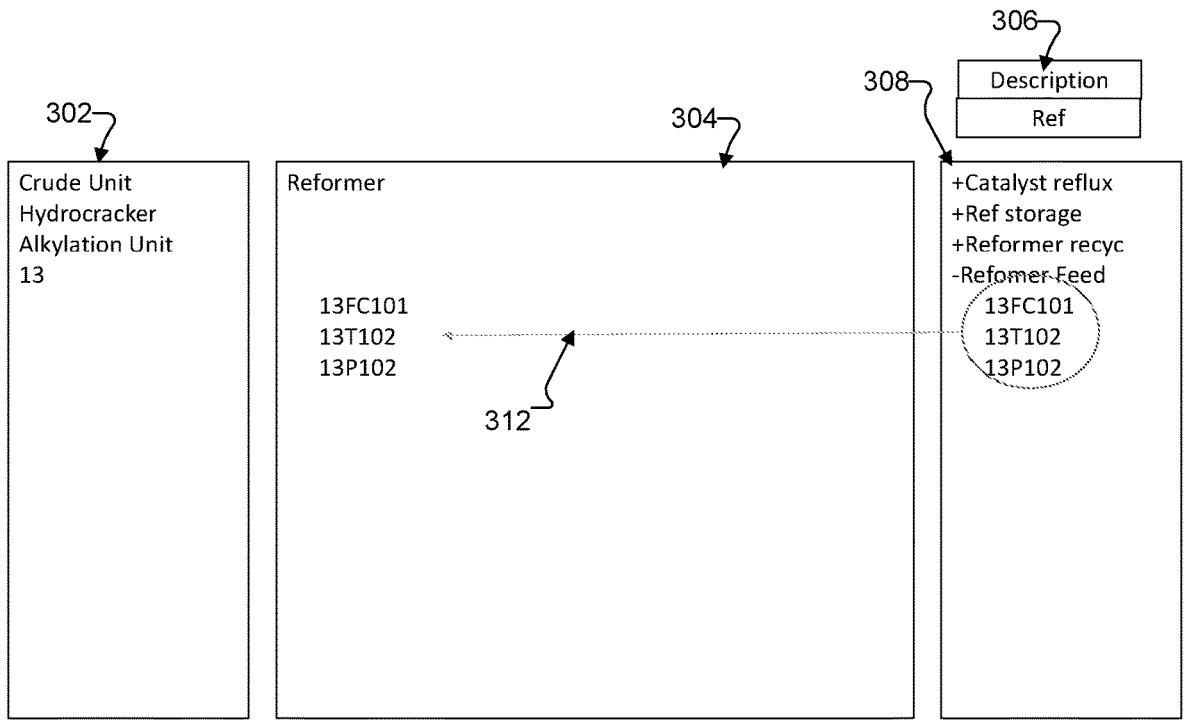

In FIG. 3C, the current action 306 is a search descriptions action based on the tag descriptions. Here, each tag that meets the condition "ref" can be retrieved and displayed. Tags related to the "reformer feed" are listed in tags 308. At step 312, the user can select which tags to map to the asset of reformer.

Figure 3D:
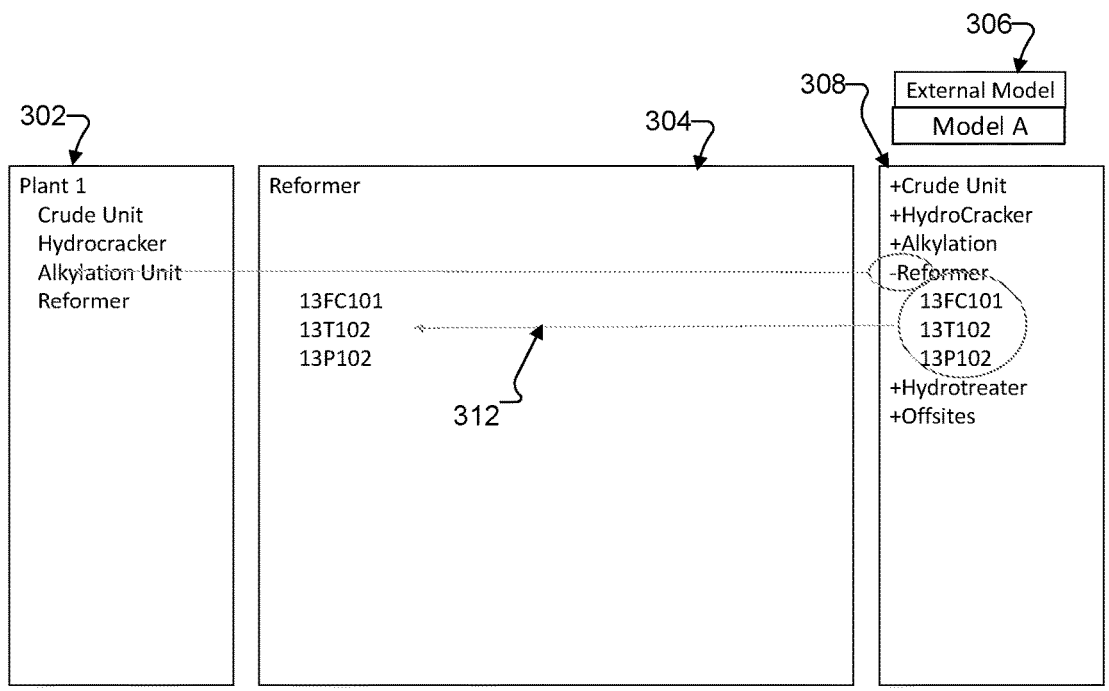

In FIG. 3D, the current action 306 is an external model action to synchronize tags from an external model. In this example, Model A is used. However, any model may be used. Here, each tag in Model A can be retrieved and displayed in tags 308. At step 312, the user can select which tags to map to the asset of reformer in this example.

Figure 3E:
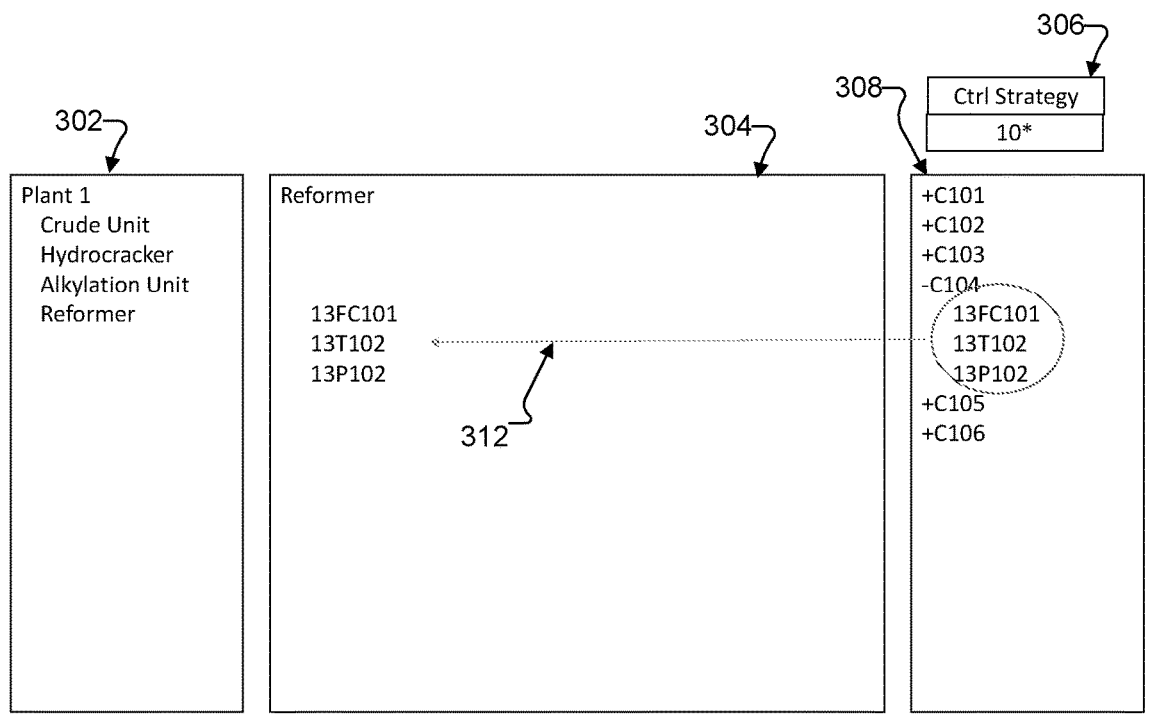

In FIG. 3E, the current action 306 is a search control strategies action. In this example, any tag with a term beginning with "10" is displayed. At step 312, the user can select which tags to map to the reformer asset, in this example. Control strategies may include connections and controls of different assets.

Figure 3F:
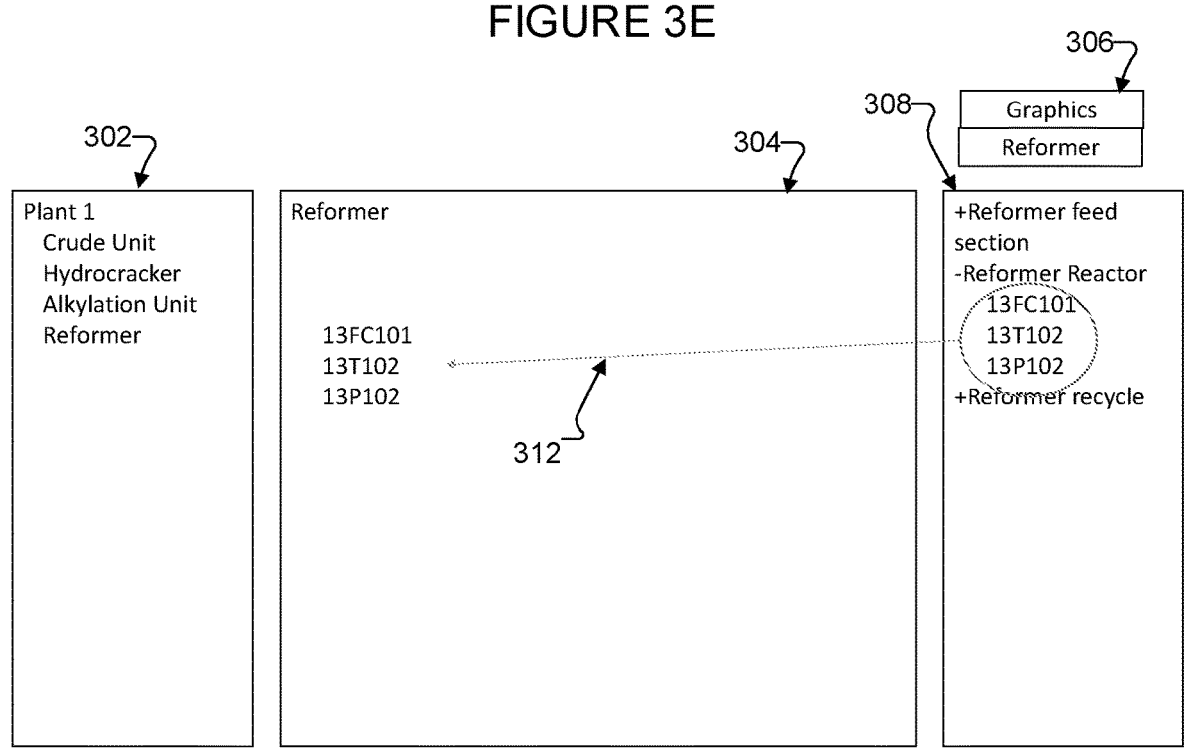

In FIG. 3F, the current action 306 is a search graphics action. Tags related to the "reformer reactor" are listed in tags 308. At step 312, the user can select which tags to map to the assets. The graphics may include displayed assets. A user can search assets on a specific display grouping.

Figure 3G:
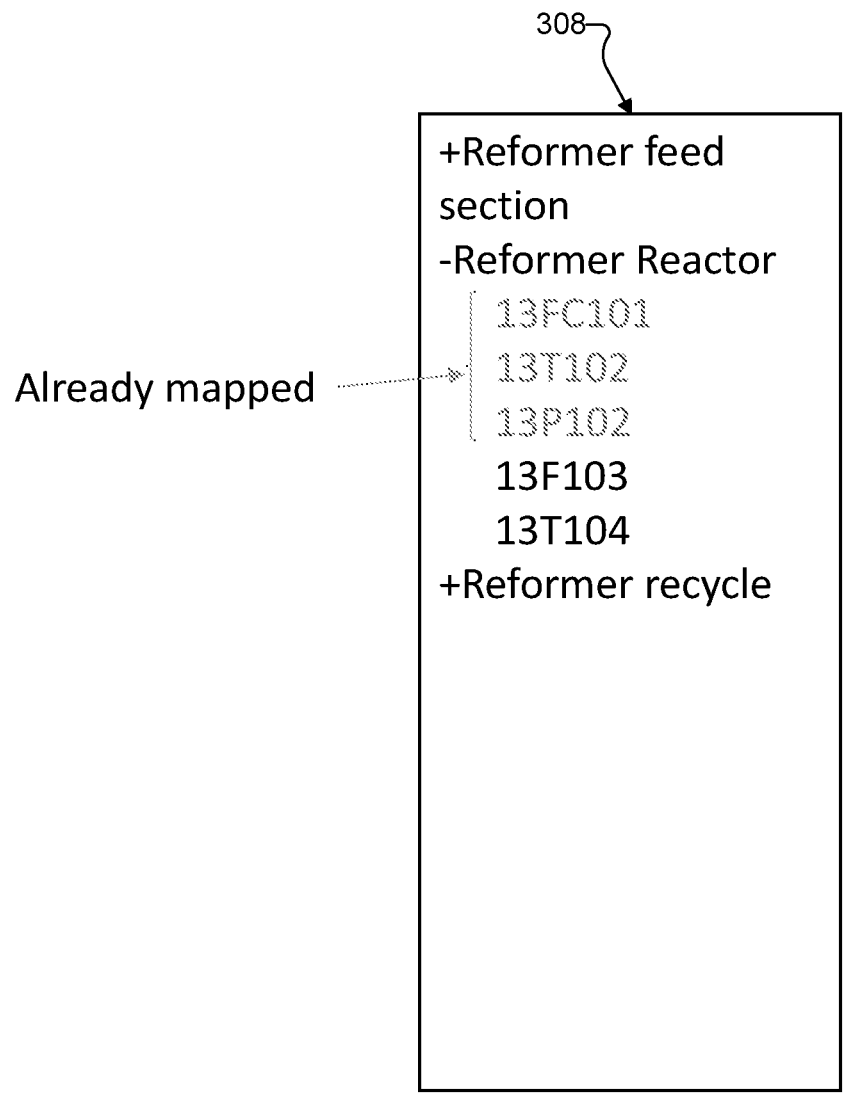

In FIG. 3G, tags are shown as already mapped by being a different shade of font. In other embodiment, these tags may be removed from display or displayed in a different manner.

Although FIGS. 3A-3G illustrate examples of different workflow options, various changes may be made to FIGS. 3A-3G. For example, while FIGS. 3A-3G shows a series of steps, various steps could overlap, occur in parallel, occur in a different order, or occur any number of times. Further, the data may be displayed in a different arrangement or format.

Figure 4:
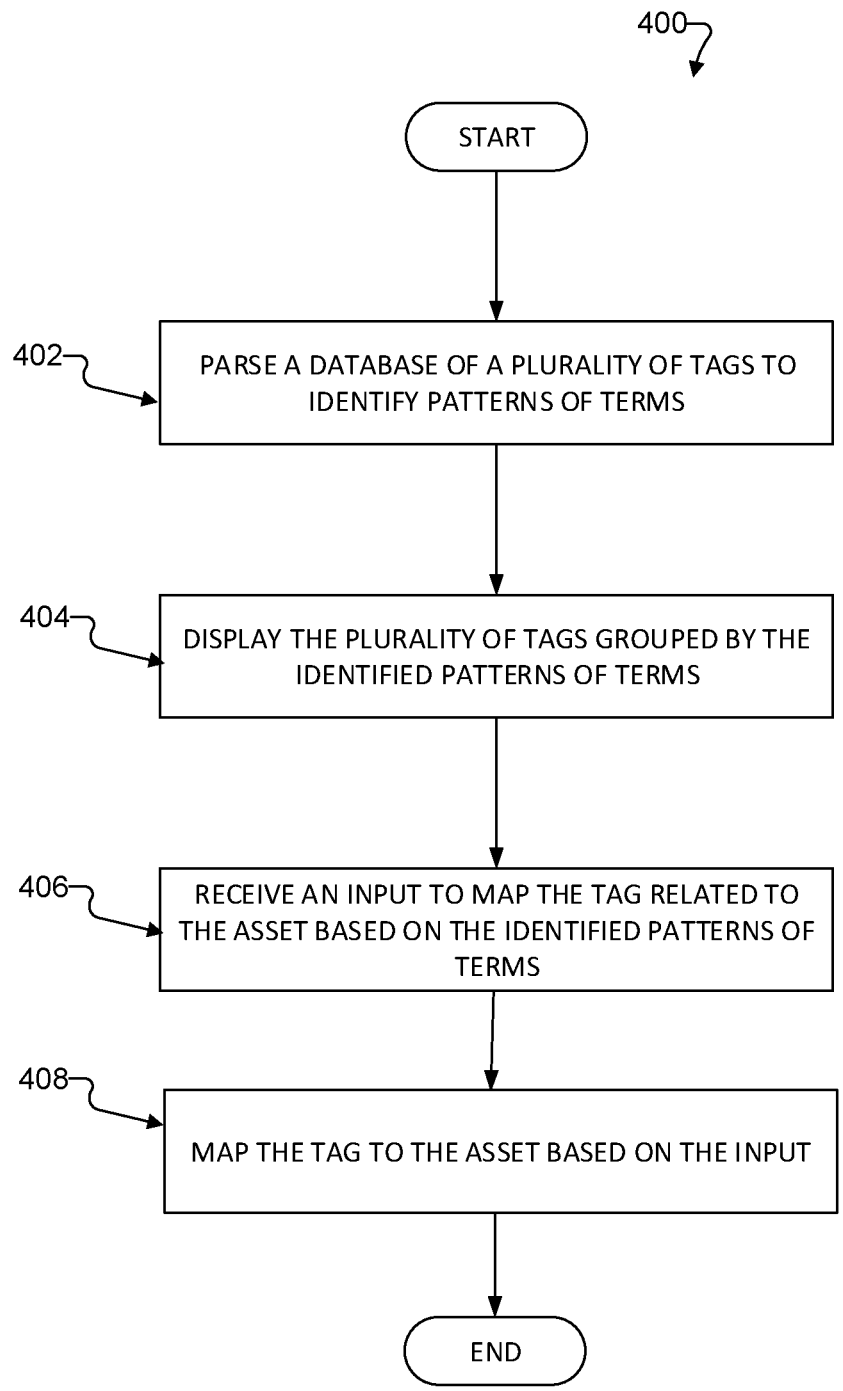
FIG. 4 illustrates an example tagging process according to this disclosure.

FIG. 4 illustrates an example tagging process 400 according to this disclosure. The process 400 shown in FIG. 4 is for illustration only. The techniques and devices described in this disclosure could find use in a wide variety of situations and are not limited to the specific uses shown in FIG. 4. In one embodiment, the operations of the process 400 can be performed using the device 200 as shown in FIG. 2.

In one embodiment, at operation 402, a device parses a database of a plurality of tags to identify patterns of terms. The plurality of tags includes one or more terms and is related to measurements performed by a field device in an industrial process control and automation system. The device inspects various existing artifacts and configuration files to find related tags and presents them to the user as being likely related to the same asset. For example, the device could find all tag references in a graphical display of a process unit and present them as groups of tags organized by graphic name and description. The same could be done with control strategies, advanced control models, saved trends, or other application models.

At operation 404, the device displays the plurality of tags grouped by the identified patterns of terms. At operation 406, the device receives an input to map a tag to the asset based on the identified patterns of terms. The user can review the groups and decide to map some or all to assets. In some examples, the user could create the asset from the group, for example by dragging the group into an asset tree and renaming the group.

In one example embodiment, the device parses tag descriptions, and groups tags based on similar descriptions, and presents these tag groups to the user. This can be effective since the tag descriptors often provide details about what the tag refers to.

At operation 408, the device maps the tag to the asset based on the input. As tags are mapped to assets, the device an keep track of which tags have been mapped and optionally only present unmapped tags in any of the approaches above. This way the user sees an ever decreasing set of tags left to map.

In another example embodiment, the device could allow multiple or even all users to contribute to configuring the model. Any time a user is working with a tag, the user could have the option to associate it with an existing or new asset if it benefits them. For example, an engineer wanting to compare the performance of several pumps may be able to find the appropriate tags for each pump, allowing associating the tags with pump assets so that the next time the tags are easy to find. A crowd-sourced model may need to support curation, whereby user-suggested additions or changes can be seen and verified.

Although FIG. 4 illustrates one example of a process 400 for supporting contextualizing tagging data, various changes may be made to FIG. 4. For example, while FIG. 4 shows a series of steps, various steps could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(1) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for contextualizing tag data comprising:
   parsing a database of a plurality of tags to identify patterns of terms, wherein the plurality of tags include one or more terms and are related to measurements performed by an asset in an industrial process control and automation system;
   identifying a characteristic of a term within the identified pattern of terms; and
   determining common patterns by identifying a change between alphabetic characters, numeric characters, or delimiter characters to indicate a beginning of a new term in the identified pattern of terms;
   updating at least one other of the plurality of tags of a similar pattern with the characteristic of the term;
   displaying the plurality of tags grouped by the identified patterns of terms;
   receiving an input to map a tag to the asset based on the identified patterns of terms; and
   mapping the tag to the asset based on the input.

2. The method of claim 1, wherein each of the patterns of terms is grouped into a hierarchical view.

3. The method of claim 1, further comprising:
   parsing the database for descriptions associated with each of the plurality of tags; and
   displaying the plurality of tags grouped by the descriptions.

4. The method of claim 1, further comprising, in response to receiving the input to map the tag, marking the tag as mapped.

5. The method of claim 1, wherein the input includes at least one of a selection to apply an industry standard naming convention and the asset.

6. The method of claim 1, further comprising removing the mapped tag from display.

7. A system comprising:
   at least one memory configured to store a plurality of tags; and
   at least one processor configured to:
   parse a database of the plurality of tags to identify patterns of terms, wherein the plurality of tags include one or more terms and are related to measurements performed by an asset in an industrial process control and automation system;
   identify a characteristic of a term within the identified pattern of terms; and
   determine common patterns by identifying a change between alphabetic characters, numeric characters, or delimiter characters to indicate a beginning of a new term in the identified pattern of terms;
   update at least one other of the plurality of tags of a similar pattern with the characteristic of the term;
   display the plurality of tags grouped by the identified patterns of terms;
   receive an input to map a tag to the asset based on the identified patterns of terms; and
   map the tag to the asset based on the input.

8. The system of claim 7, wherein each of the patterns of terms is grouped into a hierarchical view.

9. The system of claim 7, wherein the at least one processor is further configured to:
   parse the database for descriptions associated with each of the plurality of tags; and
   display the plurality of tags grouped by the descriptions.

10. The system of claim 7, wherein the at least one processor is further configured to, in response to receiving the input to map the tag, mark the tag as mapped.

11. The system of claim 7, wherein the input includes at least one of a selection to apply an industry standard naming convention and the asset.

12. The system of claim 7, wherein the at least one processor is further configured to remove the mapped tag from display.

13. A non-transitory computer readable medium containing instructions that when executed cause at least one processor to:
   parse a database of a plurality of tags to identify patterns of terms, wherein the plurality of tags include one or more terms and are related to measurements performed by asset in an industrial process control and automation system;
   identify a characteristic of a term within the identified pattern of terms; and
   determine common patterns by identifying a change between alphabetic characters, numeric characters, or delimiter characters to indicate a beginning of a new term in the identified pattern of terms;
   update at least one other of the plurality of tags of a similar pattern with the characteristic of the term;
   display the plurality of tags grouped by the identified patterns of terms;
   receive an input to map a tag to the asset based on the identified patterns of terms; and
   map the tag to the asset based on the input.

14. The non-transitory computer readable medium of claim 13, wherein each of the patterns of terms is grouped into a hierarchical view.

15. The non-transitory computer readable medium of claim 13, wherein the instructions further cause the at least one processor to:
   parse the database for descriptions associated with each of the plurality of tags; and
   display the plurality of tags grouped by the descriptions.

16. The non-transitory computer readable medium of claim 13, wherein the instructions further cause the at least one processor to, in response to receiving the input to map the tag, mark the tag as mapped.

17. The non-transitory computer readable medium of claim 13, wherein the input includes at least one of a selection to apply an industry standard naming convention and the asset.

* * * * *